United States Patent
Nuyan et al.

(10) Patent No.: US 8,489,221 B2
(45) Date of Patent: Jul. 16, 2013

(54) METHOD AND APPARATUS FOR REEL BUILDING AND ROLL RUNNABILITY IN MOVING WEB MANUFACTURING

(75) Inventors: Seyhan Nuyan, Duluth, GA (US); Calvin Fu, Richmond Hill (CA); Antti Heikkinen, Helsinki (FI); Heikki Olavi Kettunen, Espoo (FI); Lari Markus Lahdensuu, Vantaa (FI)

(73) Assignee: Metso Automation Inc., Helsinki (FI)

( * ) Notice: Subject to any disclaimer, the term of this patent is extended or adjusted under 35 U.S.C. 154(b) by 7 days.

(21) Appl. No.: 12/996,798

(22) PCT Filed: Jun. 12, 2008

(86) PCT No.: PCT/US2008/007319
§ 371 (c)(1),
(2), (4) Date: Jun. 30, 2011

(87) PCT Pub. No.: WO2009/151419
PCT Pub. Date: Dec. 17, 2009

(65) Prior Publication Data
US 2011/0264254 A1    Oct. 27, 2011

(51) Int. Cl.
*G06F 19/00* (2011.01)
(52) U.S. Cl.
USPC ............... 700/122; 700/103; 700/129
(58) Field of Classification Search
USPC ................... 700/103, 122, 129
See application file for complete search history.

(56) References Cited

U.S. PATENT DOCUMENTS

| | | | |
|---|---|---|---|
| 3,936,665 A * | 2/1976 | Donoghue | 700/129 |
| 6,343,240 B1 | 1/2002 | Shakespeare et al. | |
| 6,421,575 B1 | 7/2002 | Shakespeare | |
| 6,491,792 B2 | 12/2002 | Shakespeare et al. | |
| 6,780,284 B2 * | 8/2004 | Almi et al. | 162/198 |
| 2006/0254367 A1 | 11/2006 | Hellstrom | |
| 2007/0239310 A1 * | 10/2007 | Fan | 700/129 |
| 2008/0017341 A1 | 1/2008 | Maenpaa et al. | |

FOREIGN PATENT DOCUMENTS

WO    WO 2006/003262    *   1/2006
WO    WO 2007/115054 A2    10/2007

OTHER PUBLICATIONS

Jan. 18, 2012 Search Report issued in European Application No. 08768372.8.
Translation of Aug. 16, 2012 Office Action issued in Chinese Patent Application No. 200880130440.1.
Pi Daoying et al., "A Fuzzy-weighted Control Scheme for Multi-Model MMO Systems," ACTA Automatica SNICA, May 31, 1998, vol. 24, No. 3, pp. 387-390 (with abstract).
Sep. 24, 2008 International Search Report for International Application No. PCT/US2008/007319.
Sep. 24, 2008 Written Opinion of the International Searching Authority for International Application No. PCT/US2008/007319.

(Continued)

*Primary Examiner* — Sean Shechtman
(74) *Attorney, Agent, or Firm* — Oliff & Berridge, PLC

(57) ABSTRACT

A method and apparatus are set forth for controlling and actuator in a moving web manufacturing process. The method includes: (1) measuring a plurality of actuator profiles and in response generating nominal response models thereof; (2) generating a multivariable profile prediction based on the nominal response models; (3) generating a multivariable control target based at least one of the actuator profile; and (4) adjusting control of the actuator by minimizing error between the multivariable control target and the multivariable profile prediction.

16 Claims, 5 Drawing Sheets

OTHER PUBLICATIONS

Jul. 11, 2010 International Preliminary Report on Patentability for International Application No. PCT/US2008/007319.

Nuyan, Seyhan et al., "CD Response Detection for Control," 1998 TAPPI PCE&I Conference, Mar. 16-29, 1998, Canada, pp. 95-105.

Fu, Calvin et al., "Multivariable CD Control and Tools for Control Performance Improvement," Control Systems 2006 Conference, Jun. 6-8, 2006, Finland, pp. 215-220.

* cited by examiner

METHOD AND APPARATUS FOR REEL BUILDING AND ROLL RUNNABILITY IN MOVING WEB MANUFACTURING

FIELD

The present specification relates to the manufacture of rolls, and more particularly to a method and apparatus for controlling reel building and roll runnability in moving web manufacturing.

BACKGROUND

Paper products are normally shipped in rolls from a paper mill to a converting or printing facility. Rolls made from different paper machines or made at different times or locations of the machine may have different reel building and roll runnability characteristics, where "runnability" is an indication of how well the roll pulls through the paper-making, converting, and printing processes, as well as the flatness and uniformity of the resulting web of paper.

Online paper finishing with multi-nip calenders is well known for building reels of super-calendered (SC) or lightweight coated (LWC) paper. High quality printing papers that are calendered online are thin, very dense and therefore resistant to additional compression. With these paper properties, it has-been found that traditional methods of cross direction (CD) reel build control using contacting calliper (thickness) sensors have been difficult to optimize. In order to precisely build an SC reel with good runnability, it is known in the art to monitor and control multiple properties during the manufacturing process, such as dry weight, moisture, and caliper (thickness). More particularly, these (and other) sheet properties may be controlled in a sheet-making machine in order for the sheet properties to match, as closely as possible, pre-defined target or desired values.

The control of sheet properties is accomplished through the use of various actuators, such as machine direction (MD) actuators that control the cross direction average of a sheet property, and cross direction (CD) actuators that affect both the average of a sheet property and the cross direction shape of the sheet property. In general, the cross direction (CD) is typically perpendicular to the machine direction (MD). Overall control of sheet properties presents a problem of very large scale, with multiple inputs and outputs (e.g. several hundred CD actuators may be required to control one or more paper quality profile(s) consisting of typically 500-1200 measurement points each corresponding to 5-10 mm resolution across the web). To that end, multivariable control processes have been developed for cross-direction paper quality control, as set forth, for example, in US Patent Publication 2008/0017341 (Maenpaa et al); Calvin Fu, Jarmo Ollanketo and Jukka Makinen, *Multivariable CD Control and Tools for Control Performance Improvement*, published at the Control Systems 2006 Conference, Jun. 6-8, 2006, Tampere, Finladd, pp. 215-220; and Seyhan Nuyan, Calvin Fu and Steven Bale, "CD Response Detection for Control", presented in 1998 at the TAPPI PCE&I Conference, Vancouver, BC, Mar. 16-29, 1998, pp. 95-105 (hereinafter "Nuyan et al").

There remains a significant challenge in determining which of a multitude of paper quality profiles (e.g. reel diameter, hardness; pre-wound or wound-in tension, moisture, caliper (thickness), etc.) should be selected as control variables in a multivariable CD (MVCD) control process to address different problems (e.g. degraded roll runnability due to air entrapment versus mass variations in the web). The challenge in selecting appropriate control variables or profiles is particularly acute with highly finished grades (i.e. highly calendered) which, as discussed above, are very thin, very dense, and are characterized by very low compressibility. For example, when highly calendered papers are wound in a reel, air accumulation between layers becomes a significant factor resulting in undesired reel diameter profile shape and abnormal reel building even if the caliper profile is flat or shaped to a desired target. Therefore, using only the caliper profile for CD control is not sufficient. On the other hand, simple reel diameter control also is not an adequate solution to reel building/roll runnability problems because reel diameter measurements alone do not distinguish between irregularities caused by air entrapment and mass (caliper). Moreover, conventional solutions to these two problems are mutually exclusive; i.e. correcting problems due to air-entrapment requires an opposite control action to the action required to correct problems caused by uneven caliper (mass).

As indicated above, hardness of the reel may also provide an indicator of the reel-build process. Reel hardness is traditionally measured as the amplitude of a pulse produced by a force button on a rotating wheel that contacts the paper web. The amplitude is correlated with the force or hardness of the reel, which may therefore be considered to represent a composite measurement that better describes the reel building process than caliper does. Nonetheless, hardness measurement alone also fails to provide sufficient information for adequately controlling the reel building process, for the reasons set forth above in connection with reel diameter and caliper.

Indeed, other complex interrelations may also exist between various factors that give rise to a particular problem (e.g. the effect of forces resulting from local tension variability (LTV) on air dynamics, correlations between local hardness and LTV, or correlations between tension and moisture profiles and hardness measurement).

SUMMARY

According to one aspect of this specification, a method is set forth for controlling at least one actuator in a moving web manufacturing process, comprising determining a plurality of cross-directional property profiles and generating nominal response models thereof; generating a multivariable profile prediction based on the nominal response models; generating a multivariable control target based on the plurality of cross-directional property profiles; and adjusting control of the at least one actuator by minimizing error between the multivariable control target and multivariable profile prediction.

According to another aspect of this specification, a method is set forth for controlling at least one actuator in a moving web manufacturing process, comprising one of either measuring or calculating a single cross-directional property profile and in response, generating a nominal response model thereof; generating a single-variable profile prediction based on the nominal response model; generating a single-variable control target based on the cross-directional property profile; and adjusting control of the at least one actuator by minimizing error between the single-variable control target and single-variable profile prediction.

According to a further aspect of this specification, a cross-directional control system is set forth characterized in that current response profiles are generated for at least one of a specific process and specific reel conditions based on a selection of cross-directional profiles from the group consisting of reel diameter, caliper, hardness, moisture, tension, and weight.

BRIEF DESCRIPTION OF THE DRAWINGS

Exemplary embodiments will be better understood with reference to the following Figures in which like numerals denote like parts and in which:

FIG. 5, comprising

DETAILED DESCRIPTION

Figure 1:
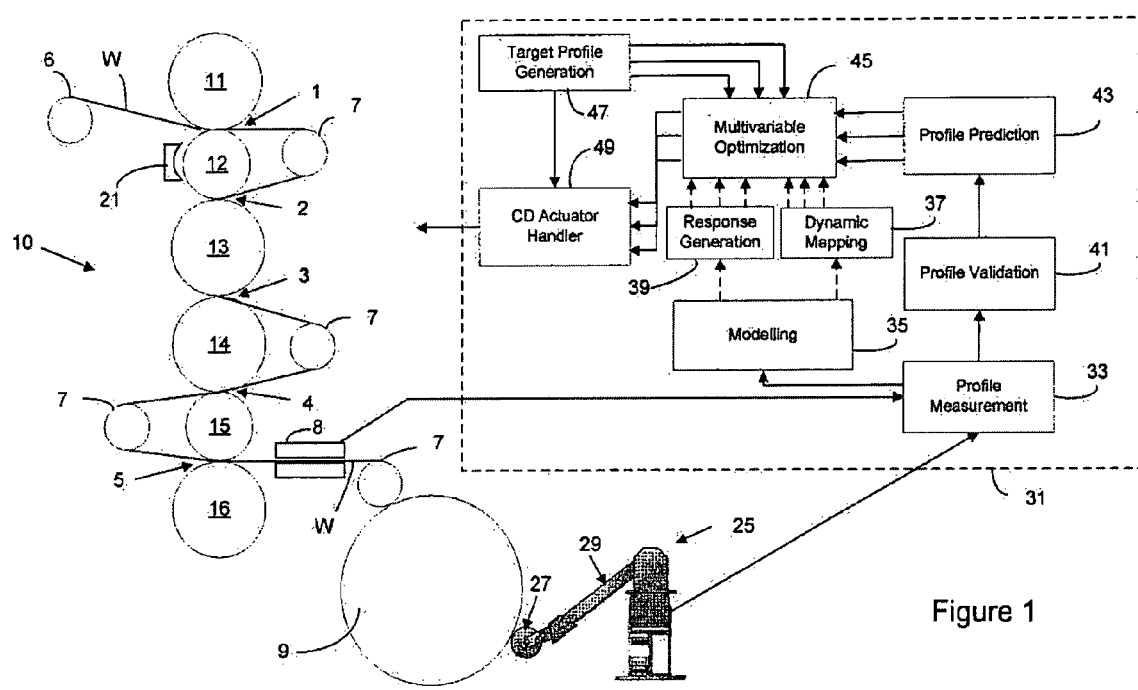
FIG. 1 is a schematic representation of a diagram of reel building arrangement incorporating a method and apparatus for controlling at least one actuator affecting reel runnability.

Turning to FIG. 1, a multi-nip calender 10 is shown comprising six rolls 11, 12, 13, 14, 15 and 16 and five nips 1, 2, 3, 4 and 5. A web W runs around a guide roll 6, into the topmost nip 1 of the calender, which is disposed between the topmost rolls 11 and 12 of the calender. The upper roll 11 may, for example, be advantageously covered with a resilient surface, such as polymer, while the lower roll 12 may be a smooth-surface press roll, such as a metal roll.

An induction heating system 21 generates magnetic flux that creates eddy currents for heating the surface of the calender roll 12 to a high surface temperature, thereby providing local non-contact heating of the metal roll 12 for better gloss, increased nip load and improved caliper and hardness.

From the topmost nip 1, the web W runs over a turning roll 7 into the second calendaring nip 2, which is formed between the heated smooth-surface press roll 12 and a roll 13 covered with a resilient cover, such as a polymer roll.

The web W then passes from the second nip 2 around the roll 13 and thence to a third nip 3. The web W runs from the third nip 3 over a turning roll 7 into the fourth calendaring nip 4, which is formed, like the first nip 1, advantageously between a smooth-surface press roll 15, such as a metal roll, which is the lower roll of the fourth nip 4, and a roll 14 covered with a resilient cover, such as a polymer roll, which is the upper roll of the fourth nip 4.

From the fourth nip 4 the web W runs again over a turning roll 7 into the fifth calendaring nip 5, which is formed, like the second calendaring nip 2, advantageously between a smooth-surface press roll 15, such as a metal roll, which is the upper roll of the fifth nip 5, and a roll 16 covered with a resilient cover, such as a polymer roll, which is the lower roll of the fifth nip 5.

According to an exemplary embodiment, any one or more of the rolls 11-16 may be zone-controlled rolls for providing profiling capabilities (i.e. multiple zone-controlled adjustment of diameter by small amounts (typically 0.5-1.0 mm) in cross direction), as is known in the art.

After the fifth nip 5, the web W is arranged to run through a thickness (caliper) measuring unit 8 and thence around a last turning roll 7 on to a reel-up/winder or spool 9. A reel diameter and hardness measuring unit 25 includes a measurement wheel 27 connected via an arm 29 to a pedestal or base. Unit 25 measures hardness measurement according to conventional methodology known in the art as the Backtender's Friend; for sensing cross-direction reel hardness via a piezo-electric crystal embedded in the rotating wheel 27. However, in addition to the conventional piezo-electric crystal, measurement unit 25 also includes a second piezo-electric crystal that measures the contact pressure applied by the measurement wheel 27 against the building paper reel on the spool 9. The measurement of hardness can therefore be taken independently of applied pressure as the reel it building. This is accomplished using a mathematical formula that includes reel diameter. As the reel builds, the angular position of the loading arm 29 changes. The loading arm 29 is therefore equipped with a rotation transducer to indicate the angular position of the wheel 27 and the diameter of the building reel as the sensor traverses from edge to edge of the web W.

A multivariable CD (MVCD) control system 31 is arranged in connection with the multi-nip calender 10 for controlling reel building and, roll runnability as the web W winds on to spool 9, via a control feedback loop between actuators, such as the induction heater 21 (and/or zone-controlled rolls), and measurement units, such as units 8 and 25. The results of measurements from units 8 and 25 are processed by the MVCD control system 31 for providing control action outputs for controlling actuators 21, etc. The non-limiting embodiment shows only a single actuator (induction heater) 21 being controlled by the MVCD control system 31, although in practice numerous actuators may be controlled. Similarly, the embodiment of FIG. 1 shows only two profile measurement units 8 and 25 whereas additional measurement units may be included (e.g. moisture detection, local tension variability (LTV), etc.)

Before further describing the non-limiting exemplary embodiment of MVCD control system 31 in FIG. 1, a brief description of multivariable CD control will be provided.

A single variable CD process model typically includes: CD actuator to measurement profile mapping, CD actuator response shape and time domain dynamics. Mapping relates the position of actuators to the position of databoxes in the measurement profile, where a "databox" is an array element in the measurement profile representing a specific measurement value at a particular CD position. The CD actuator response shape represents the change in measurement profile when only a single actuator is moved while other actuators are maintained at their "pre-bump" state. The response shape so determined is the static transfer function in space. CD actuator time domain dynamics refers to the machine direction (MD) development of the response in time. It is generally assumed to be linear, as well as time and space invariant.

A simple first order time domain model consists of time delay, response gain and time constant. This model can be expressed using the concept of a response matrix in the following format: $\Delta P_i(t) = R_i \cdot \Delta U_i(t)$, wherein $\Delta P_i(t)$ is an n-element vector representing an n cell measurement profile error from its target, $\Delta U_i(t)$ is an m-element vector representing an m cell CD actuator control action, and $R_i = G_i(q^{-1}) \cdot A_i$ represents a CD model, where the polynomial $G_i(q^{-1})$ is the dynamic part of the model. For the first order model, the dynamic part contains time delay and time constant information. The n by m response matrix $A_i$ is composed using the CD process mapping and CD actuator response shape and gain.

For multivariable CD control, models from several CD actuators to a number of paper quality profiles need to be considered. The following model can therefore be used for a multivariable CD process with M actuators and N profiles, which is essentially a dimension expansion of conventional single-variable CD control:

$$\Delta P = R \cdot \Delta U, \text{ where}$$

$$P = \begin{pmatrix} P_1 \\ P_2 \\ \ldots \\ P_N \end{pmatrix}$$

$$R = \begin{pmatrix} R_{11} & R_{12} & \ldots & R_{1M} \\ R_{21} & R_{22} & \ldots & R_{2M} \\ \ldots & \ldots & \ldots & \ldots \\ R_{N1} & R_{N2} & \ldots & R_{NM} \end{pmatrix}$$

$$U = \begin{pmatrix} U_1 \\ U_2 \\ \ldots \\ U_M \end{pmatrix}$$

In the foregoing equation, $\Delta U$ is a one-dimensional vector representing M CD actuator control actions; $\Delta P$ is a one-dimensional vector representing N measurement profile errors. Different actuator and measurement profiles can have different resolutions. Each element of the response matrix R contains a CD model associated with the corresponding actuator and measurement profile, which includes the time domain, CD actuator response and mapping.

Figure 2:
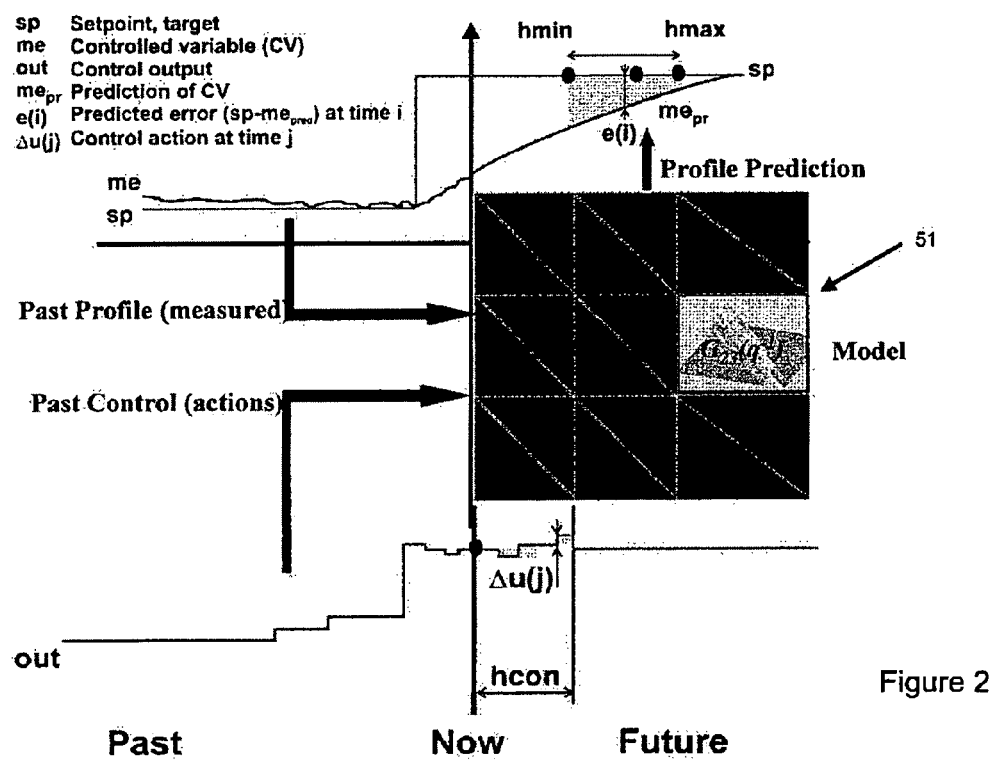
FIG. 2 is a schematic representation of a multivariable CD (MVCD) control system in the arrangement of FIG. 1.
Figure 3:
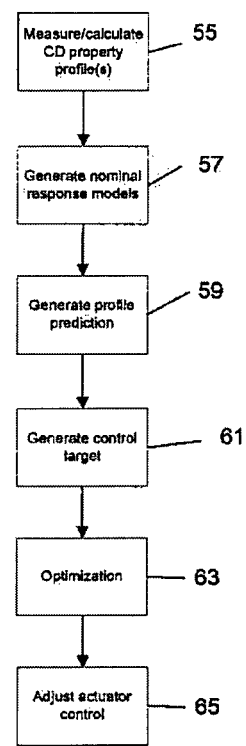
FIG. 3 is a simplified flowchart showing a method of controlling at least one actuator in the system of FIG. 1.

With reference to FIGS. 1-3, upon collection of CD actuator excitation and profile responses via the profile measurement block 33 (step 55 in FIG. 3), a modeling algorithm 35 generates CD nominal response models (step 57) via dynamic mapping block 37 and response generation block 39, set forth in'greater detail in Nuyan et al, referred to above.

The determination CD property profile at step 55 may be via measurement, calculation (or both), and the CD property profiles may include density (calculated from measurements of weight and thickness), stiffness (calculated from measurements of diameter and hardness), caliper profile, reel hardness profile, reel diameter profile, a composite of reel hardness profile and reel diameter profile, as discussed in greater detail below, or other.

A profile validation block 41 excludes any abnormal profiles that may cause extreme control actions.

A profile prediction or CD control simulation block 43 operates in connection with the core multivariable optimization block 45 and a target profile generation block 47 to process the measured cross-directional property profiles (e.g. hardness, reel diameter, calliper, etc.), calculate future profile error (step 59 in FIG. 3) and control targets (step 61 in FIG. 3), and perform multivariable control optimization (step 63) using the generated nominal profile models for generating control outputs (e.g. to zone-controlled rolls, induction heating system 21, etc.) of the calender stack 10 via CD actuator handler 49 (step 65 of FIG. 3).

More particularly, as shown in FIG. 2, a multivariable process model 51 is generated by the modelling block 35, response generation block 39 and dynamic mapping block 37. The model 51 is illustrated as a two-dimensional matrix representing a 3×3 CD process where the respective rows represents different profiles (e.g., hardness, calliper, etc.) and the columns represent different actuators in the multi-nip calender 10. The highlighted box ($G_{23}(q^{-1})$) shows the CD response (z-axis) for a single actuator, where the x-axis represents the CD direction and the y-axis represents the MD direction.

In relation to the process model discussed above, $\Delta P(t) = [G(q^{-1})F(A)]\Delta U(t)$, the predicted error $\Delta P(t)$ calculated by profile prediction block 43 is indicated by e(i) in FIG. 2, the calender stack control output (out) of multivariable optimization block 45 is represented by successive control actions $\Delta U(t)$, and the model transfer function 51, $G(q^{-1})F(A)$, is output from modeling algorithm 35, dynamic mapping block 37 and response generation block 39. Optimization of the controlled action is effected by minimizing the error e(i) between the target profile (sp) output from target profile generation block 47 and the predicted CV ($me_{pr}$), within pre-defined actuator constraints for a prediction time period between hmin and hmax, where hmin is the minimum prediction horizon and hmax is the maximum prediction horizon.

Figure 4:
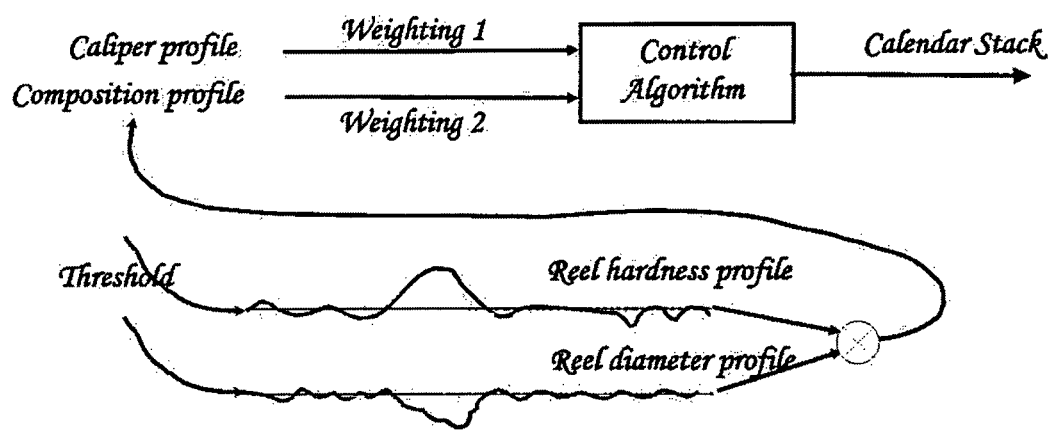
FIG. 4 is a schematic representation of multivariable control; target block in the arrangement of FIG. 1.

According to an exemplary embodiment, weightings may be applied by the target profile generation block 47 to different profiles, as shown in FIGS. 4 and 5. Thus, different weightings may be applied to respective ones of a first plurality of profiles input to optimization block 45 based on a further property or a measure of dispersion of a further property.

Figure 5A:
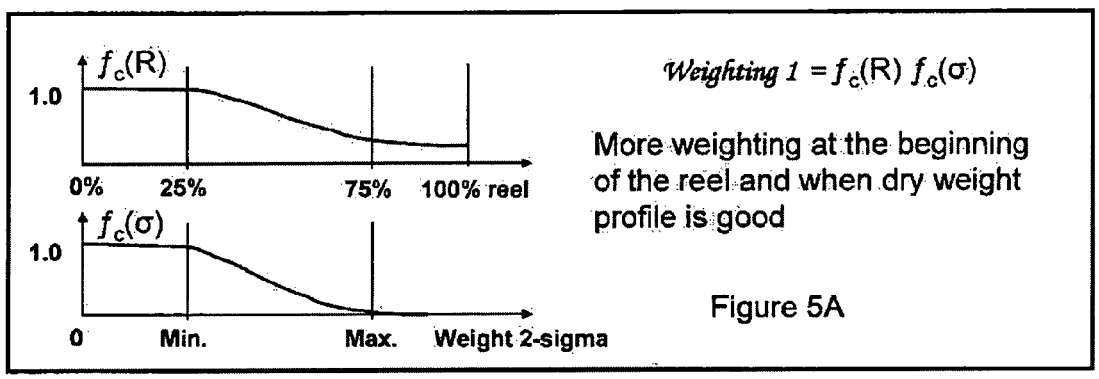
FIGS. 5A and 5B, are graphs showing exemplary control weightings for use in the multivariable control target block of FIG. 4.
Figure 5B:
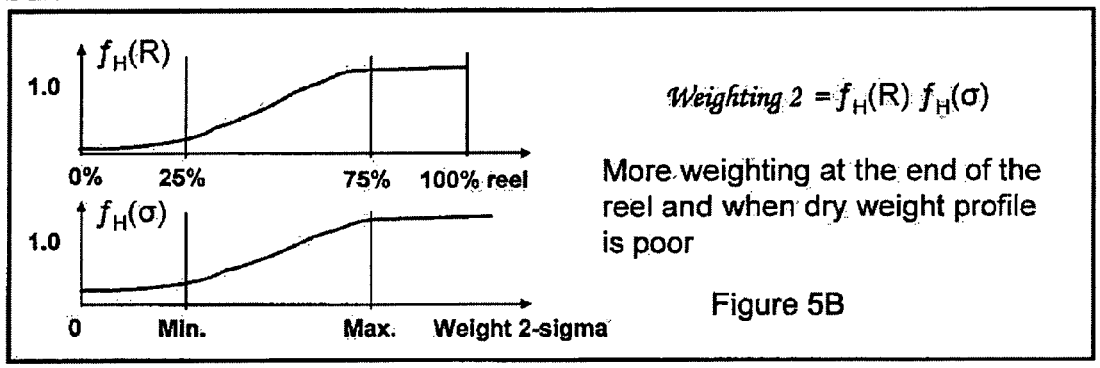

According to another exemplary embodiment, two or more of the profiles may be combined to create a composite profile for application to the optimization block 45. Moreover, it is contemplated that the dynamic weighting of cross-directional property profiles may be controlled by a further property or a measure of dispersion of a further property. For example, in a highly calendered application it may be desirable to create a composite profile from the reel hardness and reel diameter profiles and provide dynamic weightings to the caliper profile (Weighting 1) and composite profile (Weighting 2) based on the average reel diameter. This is because the diameter of the building reel will affect the influence of respective profiles on the desired control action. Specifically, at the start of the reel building process (when the reel diameter is small), it is desirable that the caliper profile have a higher weighting than the composite whereas at large reel diameters the combined reel hardness and reel diameter profiles should be emphasized in the optimization process, as shown in FIGS. 5A and 5B, wherein f(R) is the varying weighting as a function of reel diameter and f($\sigma$) is the varying weighting as a function of one of either base sheet moisture or weight variability.

The cross-directional property profile(s) may be selected based on a function of one of either a specific process or specific reel condition, such as a measured reel property (caliper, reel diameter, reel hardness, etc.) The specific process comprises the specific reel condition plus a function of a base sheet property, such as weight profile, tension profile and moisture profile. The selection function may, for example, be a measure of dispersion of a further property or may be a function such as average reel diameter. Where the function is a measure of dispersion, that measure may, for example, be one of variance, standard deviation ($\sigma$), multiples of standard deviations, coefficients of variation, etc.

Specific embodiments have been shown and described herein. However, modifications and variations may occur to those skilled in the art. For example, although the exemplary embodiment of FIG. 1 refers to measuring caliper, reel diameter and reel hardness, other measured cross-directional property profiles are possible, such as tension (pre-wound tension or wound-in tension). Also, although the exemplary embodiment of FIG. 4 shows two cross-directional property profiles, it is entirely possible that three or more profiles may be combined. Furthermore, although the two cross-directional property profiles shown in FIG. 4 are caliper profile and a composite of reel hardness profile and reel diameter profile, it is contemplated that the two cross-directional property profiles may be caliper profile and only one of reel hardness profile and reel diameter profile. In addition, whereas the dynamic weighting of cross-directional property profiles is discussed above as being controlled by average reel diameter, it is contemplated that the controlling further property may be a function of weight or tension. Moreover, although the described embodiments set forth a multivariable optimization process, it is contemplated that a single variable solution may be provided using only one controlled variable and means of target generation and/or response generation.

All such modifications and variations are believed to be within the sphere and scope of the present embodiment.

What is claimed is:

1. A method for controlling at least one array of M cross-directional actuators in a moving web manufacturing process, comprising:
    determining N sets of cross-directional property profiles from at least two different locations on said moving web and generating an N×M array of nominal responses, according to:

$$R = \begin{pmatrix} R_{11} & R_{12} & \cdots & R_{1M} \\ R_{21} & R_{22} & \cdots & R_{2M} \\ \cdots & \cdots & \cdots & \cdots \\ R_{N1} & R_{N2} & \cdots & R_{NM} \end{pmatrix}$$

where $R_{ij}$ is the nominal response from the jth array of cross-directional actuators to the ith set of cross-directional property profiles;
    generating a set of multivariable profile predictions calculated from said nominal responses to said cross-directional property profiles;
    generating a set of multivariable control target based on said plurality of cross-directional property profiles; and
    adjusting control of said at least one array of M cross-directional actuators by minimizing error between said set of multivariable control targets and said set of multivariable profile predictions, wherein different ones of said profiles have different resolutions and individual mapping arrays to each of the actuator arrays.

2. The method according to claim 1, wherein said determining comprises one of either measuring or calculating at least one of said plurality of cross-directional property profiles.

3. The method according to claim 1, wherein said determining comprises measuring at least one of said plurality of cross-directional property profiles and calculating at least one other of said plurality of cross-directional property profiles.

4. The method according to claim 2, wherein said at least one of said plurality of cross-directional property profiles is density, and wherein density is calculated from measurements of weight and thickness.

5. A method for controlling at least one array of M cross-directional actuators in a moving web manufacturing process, comprising:
    determining N sets of cross-directional property profiles from at least two different locations on said moving web and generating an N×M array of nominal responses, according to:

$$R = \begin{pmatrix} R_{11} & R_{12} & \cdots & R_{1M} \\ R_{21} & R_{22} & \cdots & R_{2M} \\ \cdots & \cdots & \cdots & \cdots \\ R_{N1} & R_{N2} & \cdots & R_{NM} \end{pmatrix}$$

where $R_{ij}$ is the nominal response from the jth array of cross-directional actuators to the ith set of cross-directional property profiles;
    generating a set of multivariable profile predictions calculated from said nominal responses to said cross-directional property profiles;
generating a set of multivariable control target based on said plurality of cross-directional property profiles; and
    adjusting control of said at least one array of M cross-directional actuators by minimizing error between said set of multivariable control targets and said set of multivariable profile predictions, wherein different ones of said profiles have different resolutions and individual mapping arrays to each of the actuator arrays,
    wherein said determining comprises one of either measuring or calculating at least one of said plurality of cross-directional property profiles, and
wherein said at least one of said plurality of cross-directional property profiles is stiffness, and wherein stiffness is calculated from measurements of diameter and hardness.

6. The method according to claim 2, wherein said at least one of said plurality of cross-directional property profiles is measured tension.

7. The method according to claim 6, wherein said measured tension is one of either pre-wound tension or wound-in tension.

8. The method according to claim 1, wherein said multivariable control target is generated based on dynamic weighting of said plurality of cross-directional property profiles.

9. The method according to claim 8, wherein said dynamic weighting of at least two of said cross-directional property profiles may be controlled by a measure of dispersion of a further property.

10. A method for controlling at least one array of M cross-directional actuators in a moving web manufacturing process, comprising:
    determining N sets of cross-directional property profiles from at least two different locations on said moving web and generating an N×M array of nominal responses, according to:

$$R = \begin{pmatrix} R_{11} & R_{12} & \cdots & R_{1M} \\ R_{21} & R_{22} & \cdots & R_{2M} \\ \cdots & \cdots & \cdots & \cdots \\ R_{N1} & R_{N2} & \cdots & R_{NM} \end{pmatrix}$$

where $R_{ij}$ is the nominal response from the jth array of cross-directional actuators to the ith set of cross-directional property profiles;
    generating a set of multivariable profile predictions calculated from said nominal responses to said cross-directional property profiles;

generating a set of multivariable control target based on said plurality of cross-directional property profiles; and adjusting control of said at least one array of M cross-directional actuators by minimizing error between said set of multivariable control targets and said set of multivariable profile predictions, wherein different ones of said profiles have different resolutions and individual mapping arrays to each of the actuator arrays, wherein said multivariable control target is generated based on dynamic weighting of said plurality of cross-directional property profiles, wherein said dynamic weighting of at least two of said cross-directional property profiles may be controlled by a measure of dispersion of a further property, and wherein said at least two cross-directional property profiles are caliper profile and one of reel hardness profile and reel diameter profile.

11. The method according to claim 9, wherein said at least two cross-directional property profiles are caliper profile and a composite of reel hardness profile and reel diameter profile.

12. The method according to claim 9, wherein said further property is average reel diameter.

13. The method according to claim 9, wherein said further property is weight.

14. The method according to claim 9, wherein said further property is caliper.

15. The method according to claim 9, wherein said measure of dispersion is one of variance, standard deviation ($\sigma$), multiples of standard deviations, or coefficient of variation.

16. The method according to claim 1, wherein at least one of said cross-directional property profiles is selected from the group consisting of reel diameter, caliper, hardness and tension.

* * * * *